April 16, 1940.  T. M. HUNTER  2,197,253
ARC WELDING SYSTEM
Filed Nov. 13, 1937
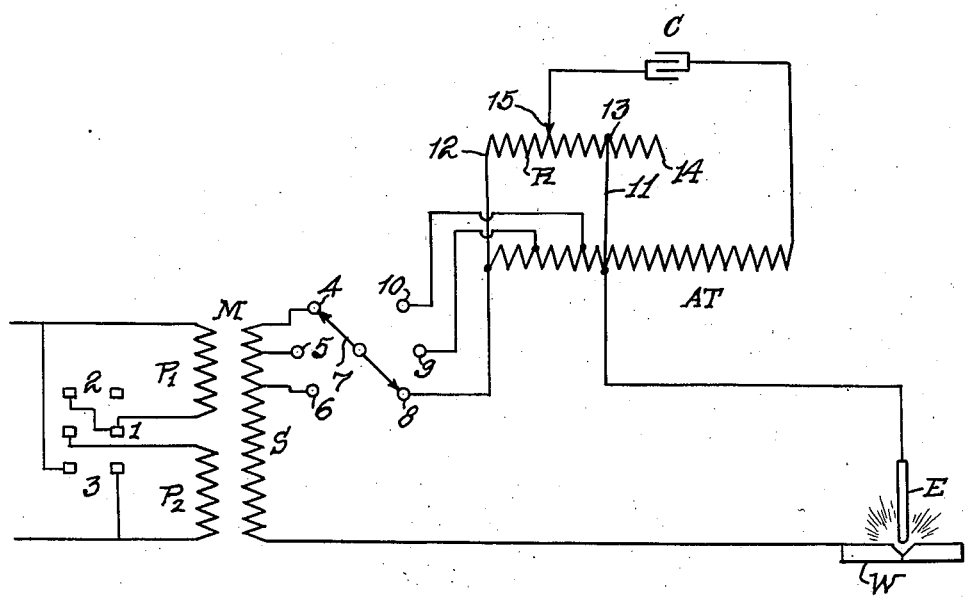
INVENTOR
Thomas M. Hunter
BY
A. D. T. Libby
ATTORNEY Patented Apr. 16, 1940

2,197,253

UNITED STATES PATENT OFFICE 2,197,253

ARC WELDING SYSTEM

Thomas M. Hunter, East Orange, N. J., assignor to American Transformer Company, Newark, N. J.

Application November 13, 1937, Serial No. 174,331

9 Claims. (Cl. 219—8)

This invention relates to an electric arc welding system, and is an improvement on the system set forth in my Patent 2,097,327, issued October 26, 1937.

In this patent I have set forth certain disadvantages, as well as advantages of using alternating current for arc welding. The said patent also sets forth the advantages of using condensers or capacities in connection with the arc welding circuit, but by further experiments and use of the structures shown and described in said patent, I have found certain improved arrangements, both mechanical and electrical, which are made the subject of this present application, as will be hereinafter set forth.

Therefore, in general, it may be said that the principal object of my present invention is to improve on the structure of my prior patent by getting a wider range and a much smoother control of the load current, without interruption of the welding operation, and without the necessity of a specially constructed and expensive switch to prevent arcing at the tap-changing contacts of the condensers.

Another object of my present improvement is to provide an arrangement in which the condensers are used in such a manner as to increase their life.

Stated in another way, in my prior patent, some of the condensers were operated at full voltage all the time, while others were cut out or removed from the circuit. In my present arrangement, the condensers are only operated at the maximum voltage when maximum current is used, and under usual welding conditions, maximum current is used only a small part of the time, so that during a large portion of the time the condensers will be operated under a lower voltage than heretofore, which will materially extend their life. In addition, the manufacturing cost of the condensers is greatly reduced from the arrangement set forth in my prior patent.

These advantages, together with others, will be seen after reading the following specification, taken in connection with the drawing, in which M is a main supply transformer having one primary or a plurality of primaries $P_1$ and $P_2$ which may be connected in series by throwing a switch I into the position 2; or in parallel, by throwing the switch I into the position 3, the series arrangement being used when the voltage supply is, for example, 440 volts; and in parallel when the supply voltage is 220 volts. While the main transformer M has a suitable iron core, yet the secondary winding S is arranged thereon so as to provide a certain amount of air leakage. I have found that such a transformer is quicker in responding to variations of the arc current. The secondary S has certain taps 4, 5 and 6 which are adapted to be connected through a switch member 7 to taps 8, 9 and 10 leading to an auto-transformer AT, which has a connection extending to the electrode E for cooperation with the work W that is connected to the other extremity of the secondary S of the main transformer M.

Connected across a portion of the transformer AT is a voltage regulator R such as shown and described in Schermerhorn Patent 2,089,434, issued August 10, 1937. This device is preferably so constructed as to have a difference of only about ½ volt between the commutator bars. Thus voltage changes of ½ volt, more or less, can be applied to the capacity of condenser C connected between the moving brush of the voltage regulator R and at one end of the auto-transformer AT. Hence, very much smoother regulation of the load current can be obtained than is possible with any other arrangement of which I am aware. For example, in my prior patent the condensers were arranged in relatively small units; such as 4 mf., but even with this relatively small unit the changes in arc current from one switch step to the next, referring to Figure 8 of the patent, were very much greater than the changes obtainable by my present arrangement, which exceedingly small changes in current are highly advantageous in welding thin material.

In my present arrangement, instead of using, for example, forty 4-mf. condenser units, I can now use ten 16-mf. units to get the same capacity, thereby reducing the cost of manufacture of the units and the cost of handling and assembling, and at the same time, due to the very small voltage changes, by means of the regulator, I can get a much smoother control of the arc current.

I have thus found a new use for the voltage regulator R in the present application to the welding system herein described. It, together with the condenser C and the transformers, are mounted in a casing somewhat along the same style as shown in my prior patent, and the whole installed or located in a place out of the way of the welding operations, although the regulator R, itself, which is a small instrument, may be located close to the welder for his convenience in changing the regulation as the welding operations progress, which is of material advantage, it being understood that the regulator can be adjusted while the current is flowing through the arc. For example, the welder can be welding with one hand and adjusting the regulator with the other.

The tap 11 from the auto-transformer AT is connected to the regulator R at the point 13 so as to provide excitation for the regulator. When the brush 15 of the regulator is moved to the left, the voltage across the capacity C is increased, and when moved to the right, this voltage is decreased.

It may be mentioned in passing that the taps 8, 9 and 10 from the auto-transformer AT are so selected and associated with the taps 4, 5 and 6 on the secondary S of the main transformer that the welding circuit will not get into resonance, but on the contrary, will maintain stable welding conditions.

Since the change in current through the capacity C is proportional to the square of the voltage, a reduction of 25% or one-quarter of the voltage across the capacity C will reduce the current one-half; whereas in the tapped condenser scheme of my prior patent, it is necessary to cut out one-half of the capacity to get one-half the current. As has been pointed out, the regulator R gives such small variations in the voltage that the current change in the welding circuit from one bar to the other on the commutator of the regulator R is very small and produces an exceedingly smooth control of the welding current over a wide range.

What I claim is:

1. In an arc welding circuit, a main supply transformer having a considerable reactance between its primary and secondary winding, the arc circuit being supplied with current from said secondary, an auto-transformer having its primary winding in series with the arc circuit, a voltage regulator of the type herein described having a movable brush electrically contacting with turns of an inductive winding excited from the auto-transformer, and a capacity connected between the traveling brush and the secondary of the auto-transformer.

2. In an alternating current metallic arc welding system, a main supply transformer having primary and secondary windings, a second transformer having primary and secondary windings, the primary winding being in series with the arc and the secondary of the main transformer, a voltage regulator of the type herein described having a movable brush electrically contacting with turns of an inductive winding excited from the primary of the second transformer, a capacity connected between the movable brush of the regulator and the end of the secondary of the second transformer, the opposite end of the secondary of the second transformer being connected to one end of the primary thereof.

3. In an alternating current arc welding system, a main feed transformer, the secondary of which is in a series circuit containing the arc electrodes, said circuit having considerable inductance therein, means for obtaining extremely small variations in the arc welding current comprising an auto-transformer having a portion of its winding connected in series with the arc circuit, and a voltage regulator comprising an inductive winding excited from the auto-transformer and having a movable brush electrically contacting with turns of said regulator winding, and a capacity continuously connected between the said movable brush and the secondary portion of the auto-transformer.

4. In an alternating current arc welding system, a main feed transformer, the secondary of which is in a series circuit containing the arc electrodes, an auto-transformer having a portion of its winding connected in series in the arc circuit and one end of the secondary of the main transformer, said connections being completed through a single switch adapted to connect taps from each of said windings in the manner and for the purpose described, a voltage regulator having a movable brush electrically contacting with turns of an inductive winding excited from the auto-transformer, and a capacity connected between the traveling brush of the regulator and a portion of the auto-transformer winding.

5. In an alternating current arc welding system, a main feed transformer, the secondary of which is in a series circuit containing the arc electrodes, said circuit having considerable inductance therein, as well as a capacity to give a series effect, and means for changing the arc current in very small steps, said means including; an auto-transformer having a portion of its winding connected in series with the arc circuit, a voltage regulator having a movable brush making electrical contact with the turns of an inductive winding excited from the auto-transformer, and a capacity connected between the movable brush and a part of the auto-transformer winding.

6. In an alternating current arc welding system having a source of supply, means for obtaining a relatively low open circuit voltage across the welding electrodes, and a voltage across the arc higher than the open circuit voltage when the arc tends to go out, said means including an inductance of relatively high value between the source of supply and the arc electrodes, and a capacity connected for series effect in the arc circuit, the capacity being fixed but the voltage applied thereto being variable to vary the current in the arc circuit without changing the open circuit voltage.

7. An arc welding system as set forth in claim 6, further characterized in that the voltage across the capacity is varied by means of a voltage regulator having an inductive winding excited from an auto-transformer, and a movable brush electrically contacting with the turns of said regulator winding, the capacity being permanently connected across the brush and the end of the auto-transformer winding, a portion of which is in series with the arc circuit.

8. In an alternating current arc welding system, a main feed transformer, the secondary of which is in a series circuit containing the arc electrodes, said circuit having considerable inductance therein, as well as a capacity to give a series effect, and means for changing the arc current in very small steps, said means including; an auxiliary transformer having a winding connected in series with the arc circuit, a voltage regulator connected to a winding of the auxiliary transformer and having a movable element adapted to deliver a variable voltage from the regulator, a capacity connected between the movable element of the regulator and a winding inductively associated with the first-mentioned winding of the auxiliary transformer whereby the charging current of the capacity can be varied, the variation of which varies the current in the arc circuit.

9. In an alternating current arc welding system having a source of current-supply for the arc, the arc circuit having inductance therein, an auxiliary transformer having a winding in series with the arc, means for obtaining smooth and fine adjustment of the arc current while the arc is running, said means including a voltage regulator having a winding connected to a winding of said auxiliary transformer and having a movable element contacting with the regulator winding to pick up therefrom small changes in voltage, and a capacity permanently connected between said movable element and the end of the winding of said auxiliary transformer whereby the said small changes in voltage across the whole capacity will vary the arc current in a manner substantially as described.

THOMAS M. HUNTER.